US010317004B2

(12) United States Patent
Kobayashi et al.

(10) Patent No.: US 10,317,004 B2
(45) Date of Patent: Jun. 11, 2019

(54) POROUS PLATE-SHAPED FILLER, HEAT INSULATION FILM, AND METHOD FOR PRODUCING POROUS PLATE-SHAPED FILLER

(71) Applicant: NGK INSULATORS, LTD., Nagoya (JP)

(72) Inventors: Hiroharu Kobayashi, Nagoya (JP); Takahiro Tomita, Nagoya (JP); Akinobu Oribe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 89 days.

(21) Appl. No.: 15/284,798

(22) Filed: Oct. 4, 2016

(65) Prior Publication Data
US 2017/0023168 A1    Jan. 26, 2017

Related U.S. Application Data

(63) Continuation of application No. PCT/JP2015/061319, filed on Apr. 13, 2015.

(30) Foreign Application Priority Data

Apr. 17, 2014 (JP) ................. 2014-085911

(51) Int. Cl.
| | | |
|---|---|---|
| C09D 7/40 | (2018.01) | |
| F16L 59/02 | (2006.01) | |
| C09D 7/62 | (2018.01) | |
| C04B 38/00 | (2006.01) | |
| C04B 38/06 | (2006.01) | |
| C09D 201/00 | (2006.01) | |
| C09C 1/00 | (2006.01) | |
| C09C 1/30 | (2006.01) | |
| C09C 1/36 | (2006.01) | |
| C09C 1/40 | (2006.01) | |
| C09C 3/00 | (2006.01) | |
| C09C 3/04 | (2006.01) | |
| C09C 3/06 | (2006.01) | |
| C09C 3/10 | (2006.01) | |
| C09D 183/04 | (2006.01) | |
| C04B 35/48 | (2006.01) | |

(52) U.S. Cl.
CPC ............ *F16L 59/028* (2013.01); *C04B 38/00* (2013.01); *C04B 38/06* (2013.01); *C09C 1/00* (2013.01); *C09C 1/309* (2013.01); *C09C 1/3607* (2013.01); *C09C 1/407* (2013.01); *C09C 3/00* (2013.01); *C09C 3/043* (2013.01); *C09C 3/06* (2013.01); *C09C 3/10* (2013.01); *C09D 7/40* (2018.01); *C09D 7/62* (2018.01); *C09D 183/04* (2013.01); *C09D 201/00* (2013.01); *C01P 2004/24* (2013.01); *C01P 2006/32* (2013.01); *C04B 35/48* (2013.01)

(58) Field of Classification Search
CPC .. C01P 2004/24; C01P 2006/32; C04B 35/48; C04B 38/00; C04B 38/06; C09C 1/00; C09C 1/309; C09C 1/3607; C09C 1/407; C09C 3/00; C09C 3/043; C09C 3/06; C09C 3/10; C09D 183/04; C09D 201/00
See application file for complete search history.

(56) References Cited

U.S. PATENT DOCUMENTS

| | | | | |
|---|---|---|---|---|
| 2007/0221884 A1* | 9/2007 | Hoppe | .............. | A61K 8/25 |
| | | | | 252/301.28 |
| 2009/0145332 A1* | 6/2009 | Wheeler | ............... | C09C 1/0018 |
| | | | | 106/400 |
| 2013/0316130 A1* | 11/2013 | Takahashi | ........... | C04B 38/0009 |
| | | | | 428/116 |
| 2015/0104626 A1 | 4/2015 | Tomita et al. | | |

FOREIGN PATENT DOCUMENTS

| | | |
|---|---|---|
| JP | 2005-263537 A1 | 9/2005 |
| JP | 2007-112948 A | 5/2007 |
| JP | 2009-274895 A1 | 11/2009 |
| WO | 2013/191263 A1 | 12/2013 |

OTHER PUBLICATIONS

S. Gaydardzhiev, et al., "Gel-Casted Porous $Al_2O_3$ Ceramics by Use of Natural Fibres as Pore Developers," Journal of Porous Materials, vol. 15, Issue 4, 2008, pp. 475-480.
International Search Report and Written Opinion (PCT/JP2015/061319) dated Jun. 16, 2015.
Extended European Search Report, European Application No. 15779615.2, dated Dec. 5, 2014 (9 pages).

(Continued)

*Primary Examiner* — Frank J Vineis
*Assistant Examiner* — Lawrence D Ferguson
(74) *Attorney, Agent, or Firm* — Burr & Brown, PLLC (57) ABSTRACT

A porous plate-shaped filler is a plate shape having an aspect ratio of 3 or more, and has a minimum length of 0.1 to 50 μm and a porosity of 20 to 90%. Furthermore, the porous plate-shaped filler 1 includes plate-shaped pores 2 having an aspect ratio of 1.5 or more. Consequently, in the porous plate-shaped filler, a thermal conductivity is low. The heat insulation film includes the porous plate-shaped filler, whereby a heat insulation effect of the heat insulation film can improve.

7 Claims, 3 Drawing Sheets

(56) References Cited

OTHER PUBLICATIONS

Wang, L., et al., "Influence of pores on the thermal insulation behavior of thermal barrier coatings prepared by atmospheric plasma spray," *Materials and Design*, vol. 32, No. 1, pp. 36-47, dated Jan. 1, 2011.

Jianwei, Su., et al., "Highly efficient and recyclable triple-shelled Ag@$Fe_3O_4$@$SiO_2$@$TiO_2$ photocatalysts for degradation of organic pollutants and reduction of hexavalent chromium ions," *Nanoscale*, vol. 6, No. 10, pp. 5181-5192, dated Jan. 1, 2014.

Lee, J.-H., et al., "The impact of anode microstructure on the power generating characteristics of SOFC," *Solid State Ionics*, vol. 158, No. 3-4, pp. 225-232, dated Mar. 1, 2003.

\* cited by examiner

FIG. 4B ained length of 0.1 to 50 μm and a porosity of 20 to 90%, and includes plate-shaped pores having an aspect ratio of 1.5 or more.
POROUS PLATE-SHAPED FILLER, HEAT INSULATION FILM, AND METHOD FOR PRODUCING POROUS PLATE-SHAPED FILLER

BACKGROUND OF THE INVENTION

1. Field of The Invention

The present invention relates to a porous plate-shaped filler to form a heat insulation film in which a heat insulation effect improves, a heat insulation film including the porous plate-shaped filler, and a method for producing the porous plate-shaped filler.

2. Description of Related Art

As a heat insulation film formed on the surface of an article to improve a heat insulation effect and flame retardance of the article, there is known a film in which porous plate-shaped fillers having a low thermal conductivity are arranged in the form of layers in a matrix made of a resin or the like. Patent Document 1 discloses, as fillers to be included in a heat insulation film, porous plate-shaped fillers which are plates having an aspect ratio of 3 or more, a minimum length of 0.1 to 50 μm and a porosity of 20 to 99%. In the heat insulation film using the porous plate-shaped fillers, a length of a heat insulation route increases and a thermal conductivity can decrease as compared with a case of using spherical or cubic fillers. Consequently, even a thin heat insulation film has a heat insulation effect higher than before. Furthermore, a mutual bonding area of the porous plate-shaped fillers via the matrix is larger as compared with the case of using the spherical filler or the like, and hence strength can improve.

Furthermore, Patent Document 1 discloses, as a method for producing the porous plate-shaped filler, a method of firing a green sheet made of a material including ceramics powder and suitably grinding the fired green sheet. Furthermore, as another producing method, there is also disclosed a method of performing processing such as cutting or punching of the material in a state of the green sheet prior to the firing into a predetermined surface shape, and firing the green sheet to produce the porous plate-shaped filler without performing the grinding after the firing.

CITATION LIST

Patent Documents

[Patent Document 1] WO 2013/191263

SUMMARY OF THE INVENTION

Problem to be Solved by the Invention

However, a heat insulation film having a lower thermal conductivity is further desired.

An object of the present invention is to provide a porous plate-shaped filler to form a heat insulation film in which a heat insulation effect improves, a heat insulation film including the porous plate-shaped filler, and a method for producing the porous plate-shaped filler.

Means for Solving the Problem

The present inventors have found that a porous plate-shaped filler is a plate shape having an aspect ratio of 3 or more, has a minimum length of 0.1 to 50 μm and a porosity of 20 to 90%, and includes plate-shaped pores having an aspect ratio of 1.5 or more, thereby making it possible to achieve the above object. That is, according to the present invention, there are provided a porous plate-shaped filler, a heat insulation film including the porous plate-shaped filler, and a method for producing the porous plate-shaped filler as follows.

According to a first aspect of the present invention, a porous plate-shaped filler is provided which is a plate shape having an aspect ratio of 3 or more, has a minimum length of 0.1 to 50 μm and a porosity of 20 to 90%, and includes plate-shaped pores having an aspect ratio of 1.5 or more.

According to a second aspect of the present invention, the porous plate-shaped filler according to the above first aspect is provided, wherein in a cross section in a direction of the minimum length of the porous plate-shaped filler, an average of angles between directions of minimum lengths of the pores and the direction of the minimum length of the porous plate-shaped filler is 45° or less.

According to a third aspect of the present invention, the porous plate-shaped filler according to the above first or second aspects is provided, wherein a thermal conductivity in the direction of the minimum length of the porous plate-shaped filler is 1 W/(m·K) or less.

According to a fourth aspect of the present invention, a heat insulation film which includes the porous plate-shaped filler according to any one of the above first to third meets is provided.

According to a fifth aspect of the present invention, the heat insulation film according to the above fourth aspect is provided, wherein the thermal conductivity in a thickness direction is 1.5 W/(m·K) or less.

According to a sixth aspect of the present invention, a method for producing the porous plate-shaped filler according to any one of the above first to third aspects is provided, which includes preparing a slurry including a plate-shaped pore former having an aspect ratio of 1.5 or more, and firing the pore former to produce the porous plate-shaped filler including the plate-shaped pores having an aspect ratio of 1.5 or more.

According to a seventh aspect of the present invention, the method for producing the porous plate-shaped filler according to the above sixth aspect is provided, wherein a viscosity of the slurry is from 100 to 90000 cps.

Effect of the Invention

A porous plate-shaped filler is a plate shape having an aspect ratio of 3 or more, and has a minimum length of 0.1 to 50 μm and a porosity of 20 to 90%. Furthermore, the porous plate-shaped filler includes plate-shaped pores having an aspect ratio of 1.5 or more. Consequently, the porous plate-shaped filler has a low thermal conductivity. A heat insulation effect of a heat insulation film including this porous plate-shaped filler can improve.

DETAILED DESCRIPTION OF THE INVENTION

Hereinafter, embodiments of the present invention will be described with reference to the drawings. The present invention is not limited to the following embodiment, and changes, modifications or improvements can be added thereto without departing from the gist of the invention.

1. Porous Plate-Shaped Filler

Figure 1:
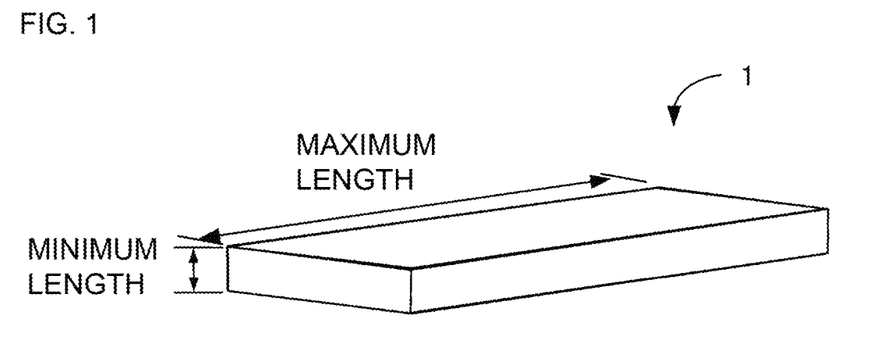
FIG. 1 is a schematic view showing one embodiment of a porous plate-shaped filler.
Figure 2A:
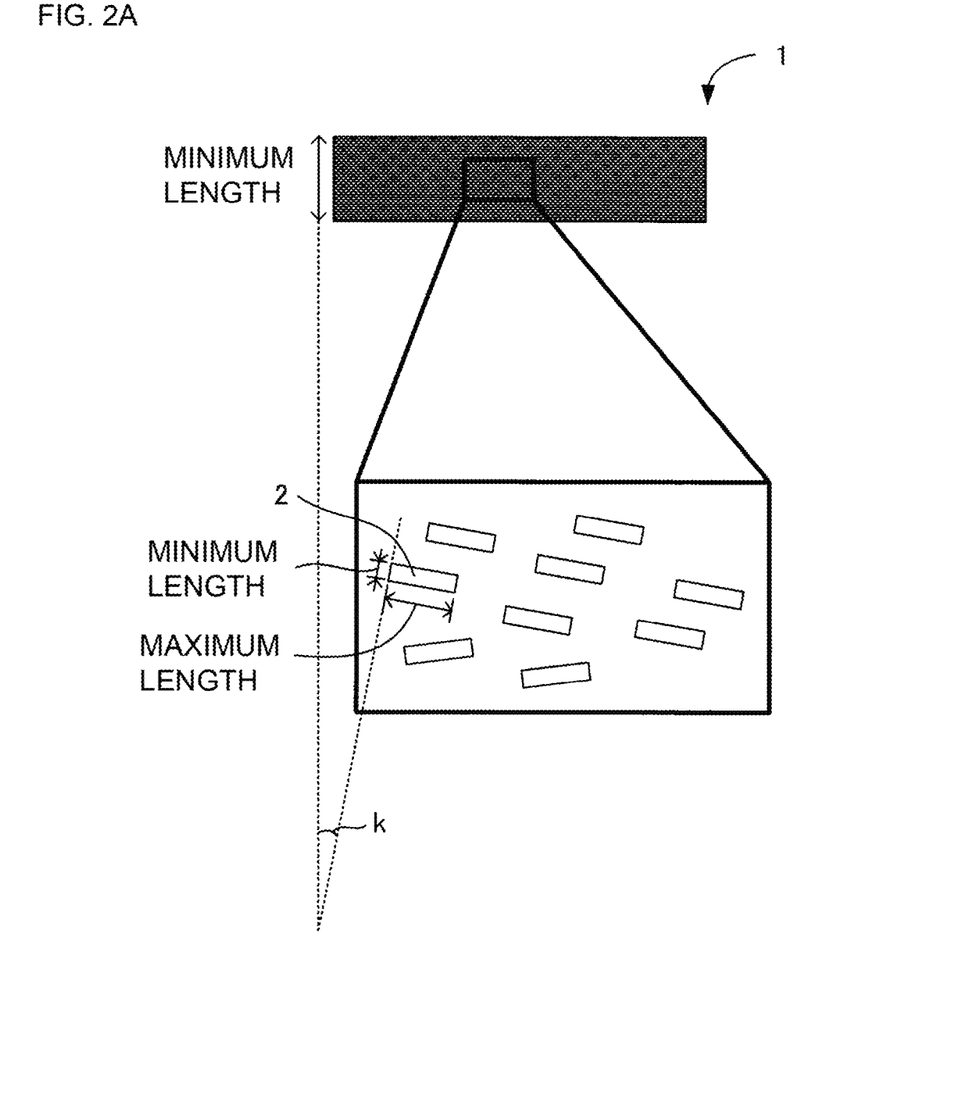
FIG. 2A is a view showing a cross section of the porous plate-shaped filler and its enlargement.

FIG. 1 and FIG. 2A show one embodiment of a porous plate-shaped filler 1 of the present invention. FIG. 1 is a schematic view showing the one embodiment of the porous plate-shaped filler 1. Furthermore, FIG. 2A is a view showing a cross section of the porous plate-shaped filler 1 and its enlargement. The porous plate-shaped filler 1 is a plate shape having an aspect ratio of 3 or more, and has a minimum length of 0.1 to 50 μm and a porosity of 20 to 90%. Furthermore, the porous plate-shaped filler 1 has plate-shaped pores 2 having an aspect ratio of 1.5 or more.

It is preferable that the porous plate-shaped filler 1 has the pores 2 in which pore sizes are from 10 to 500 nm. The porosity of the porous plate-shaped filler 1 is preferably from 20 to 90%, more preferably from 40 to 85%, and further preferably from 50 to 80%. When the porosity is adjusted into 90% or less, it is possible to acquire a strength. Furthermore, when the porosity is adjusted into 20% or more, it is possible to decrease a thermal conductivity. In the present description, the porosity is obtained by the next equation:

Porosity (%)=(1−(apparent particle density/true density))×100

In the above equation, the apparent particle density is measured by a liquid immersion method using mercury. Furthermore, the true density is measured by pycnometry after sufficiently grinding the porous plate-shaped filler 1.

In the present description, the aspect ratio of the porous plate-shaped filler 1 is defined by a maximum length/the minimum length of the porous plate-shaped filler 1. Here, the maximum length is a length maximized when sandwiching a particle (the porous plate-shaped fillers 1) between a pair of parallel surfaces. Furthermore, the minimum length is a length minimized when similarly sandwiching the particle between the pair of parallel surfaces, and corresponds to a so-called thickness in a case of a flat plate. The plate shape of the porous plate-shaped filler 1 includes not only a flat plate shape (the plate which is flat and does not curve) but also a curved flat plate shape and a plate shape having a thickness (the minimum length) which is not constant, as long as the aspect ratio is 3 or more and the minimum length is from 0.1 to 50 μm. Furthermore, the filler may have a shape such as a fibrous shape, a needle shape or a billet shape. Among these shapes, the porous plate-shaped filler 1 is preferably the flat plate. Furthermore, a surface shape of the plate may be any shape such as a square shape, a quadrangular shape, a triangular shape, a hexagonal shape or a round shape. That is, the porous plate-shaped filler 1 may have any shape as long as the filler is the plate.

Figure 3:
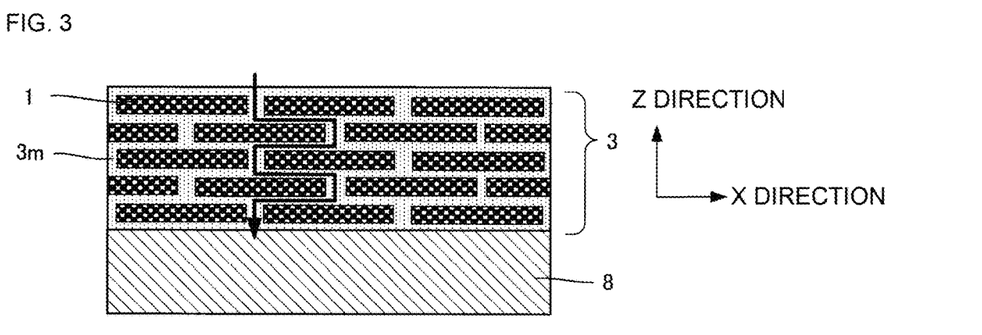
FIG. 3 is a schematic view showing one embodiment of a heat insulation film of the present invention.

It is preferable that the aspect ratio of the porous plate-shaped filler 1 is 3 or more. As the aspect ratio is larger, a heat transfer path deflects to lengthen and the thermal conductivity of a heat insulation film 3 decreases, when the heat insulation film 3 is formed. However, when the aspect ratio is excessively large, it becomes difficult to handle the filler during producing, and yield might deteriorate. For example, when the minimum length is decreased to increase the aspect ratio, the strength might not sufficiently be obtained. On the other hand, when increasing the maximum length, the porous plate-shaped filler 1 might become large and be damaged. Consequently, the aspect ratio is more preferably 3 or more and 50 or less, further preferably 3.5 or more and 40 or less, and most preferably 4 or more and 30 or less.

In the present description, the aspect ratio of the pore 2 of the porous plate-shaped filler 1 is defined by a maximum length/a minimum length of the pore 2. The maximum length of the pore 2 is a maximum length in a cross section of the porous plate-shaped filler 1 in a direction of the minimum length. After determining the maximum length of the pore 2, a line vertical to the maximum length is drawn, and a length of the vertical line is defined as the minimum length of the pore 2. When observing shapes of about 50 pores 2 present in the porous plate-shaped filler 1 and obtaining the aspect ratio of each of the pores 2 from the maximum length/the minimum length, an average aspect ratio is 1.5 or more and is preferably 3 or more. When the aspect ratios of the pores 2 heighten and directions of the pores 2 are aligned, the thermal conductivity of the porous plate-shaped filler 1 in a direction crossing the pore 2 decreases. When the thermal conductivity of the porous plate-shaped filler 1 decreases, a heat insulation effect of the heat insulation film 3 including this filler can improve, and in a case of forming the heat insulation film 3, a thickness of the heat insulation film 3 can decrease. Consequently, it is possible to anticipate the effect that a space broadens, and it is possible to decrease cost. Furthermore, in a case of bonding the heat insulation film 3 to a material different from the film, it is possible to decrease thermal stress, and a heat resistance can improve.

When a shape of the pore 2 is a plate shape, a surface shape may be one of a square shape, a quadrangular shape, a triangular shape, a hexagonal shape, a round shape, and an intermediate shape. That is, there is not any special restriction on the shape of the pore 2, as long as the pore has a plate-shaped shape having an aspect ratio of 1.5 or more. Furthermore, the aspect ratio of the pore 2 is the same degree as in the aspect ratio of a pore former. That is, the shape of the pore 2 is determined by a shape of the pore former, and hence it is preferable to use the pore former of a plate-shaped shape having an aspect ratio of 1.5 or more and preferably 3 or more.

There is not any special restriction on a material of the pore former, as long as the material has the above shape, but there is usable graphite, latex, melamine resin, PMMA, polyethylene, polystyrene, carbon black, foamable resin, water absorbable resin or the like.

FIG. 2A shows the porous plate-shaped filler 1 and also shows an enlarged view of a part of the filler. In the enlarged view, the pores 2 are drawn in the porous plate-shaped filler 1, but the view shows a direction of the minimum length of the pore 2 and a direction of the minimum length of the porous plate-shaped filler 1. In the cross section of the direction of the minimum length of the porous plate-shaped filler 1, an average of angles k between the directions of the minimum lengths of the pores 2 and the direction of the minimum length of the porous plate-shaped filler 1 is preferably 45° or less, more preferably 30° or less, and further preferably 10° or less. When the direction of the pore 2 is defined in this manner, it is possible to decrease the thermal conductivity in the direction of the minimum length of the porous plate-shaped filler 1.

Examples of a material of the porous plate-shaped filler 1 include hollow plate-shaped glass and hollow plate-shaped ceramics. Furthermore, the examples of the material include mesoporous silica, mesoporous titania, mesoporous zirconia, and Shirasu balloons. Alternatively, an example of the filler is also a porous plate-shaped filler obtained by an after-mentioned producing method.

The porous plate-shaped filler 1 preferably includes a metal oxide, and is further preferably constituted only of the metal oxide. This is because, when the filler includes the metal oxide, ion bonding properties between a metal and oxygen are strong and hence the thermal conductivity is easy to decrease as compared with a non-oxide (e.g., a carbide or a nitride) of the metal.

In the porous plate-shaped filler 1, it is preferable that the metal oxide is an oxide of one selected from the group consisting of elements such as Zr, Y, Al, Si, Ti, Nb, Sr, La, Hf, Ce, Gd, Sm, Mn, Yb, Er and Ta or a complex oxide of two or more selected from the group. When the metal oxide is the oxide or the complex oxide of these elements, heat conduction is hard to occur by lattice vibration (phonons) which is a main factor of the heat conduction. A specific example of the material of the porous plate-shaped filler 1 is a material obtained by adding $Gd_2O_3$, $Yb_2O_3$, $Er_2O_3$ or the like to $ZrO_2$—$Y_2O_3$. Further specifically, the examples of the material include $ZrO_2$—$HfO_2$—$Y_2O_3$, $ZrO_2$—$Y_2O_3$—$La_2O_3$, $ZrO_2$—$HfO_2$—$Y_2O_3$—$La_2O_3$, $HfO_2$—$Y_2O_3$, $CeO_2$—$Y_2O_3$, $Gd_2Zr_2O_7$, $Sm_2Zr_2O_7$, $LaMnAl_{11}O_{19}$, $YTa_3O_9$, $Y_{0.7}La_{0.3}Ta_3O_9$, $Y_{1.08}Ta_{2.76}Zr_{0.24}O_9$, $Y_2Ti_2O_7$, $LaTa_3O_9$, $Yb_2Si_2O_7$, and $Y_2Si_2O_7$.

The porous plate-shaped filler 1 may be an inorganic material, an organic material, or a composite material of the inorganic material and the organic material. Above all, it is preferable that the material is an inorganic material such as zirconia, partially stabilized zirconia (e.g., yttria partially stabilized zirconia), completely stabilized zirconia (e.g., yttria completely stabilized zirconia), yttrium oxide, alumina, silica, titania, niobium oxide, strontium oxide, lanthanum oxide, zirconium, yttria, aluminum, silicon, titanium, niobium, strontium, lanthanum, rare earth zirconate (e.g., lanthanum zirconate), rare earth silicate (e.g., yttrium silicate), niobate (e.g., strontium niobate), mullite, mica, spinel, zircon, magnesia, ceria, silicon carbide, silicon nitride, aluminum nitride or strontium carbonate. It is more preferable that the material is a metal oxide such as zirconia, partially stabilized zirconia (e.g., yttria partially stabilized zirconia), completely stabilized zirconia (e.g., yttria completely stabilized zirconia), yttrium oxide, alumina, silica, titania, niobium oxide, strontium oxide or lanthanum oxide. One of them may be used alone, or any combination of two or more of them may be used.

It is preferable that the porous plate-shaped filler 1 includes particles having particle sizes of 1 nm to 10 μm. The particle may be a particle constituted of one crystal grain (a single crystalline particle) or a particle constituted of a large number of crystal grains (a polycrystalline particle). That is, it is preferable that the porous plate-shaped filler 1 is an aggregate of particles having particle sizes of this range. For the particle size, a size of one particle of a particle group constituting a framework of the porous plate-shaped filler 1 (in the case of a spherical particle, the size is a diameter, and in another case, the size is a maximum diameter) is measured from an image of electron microscope observation. The particle size is more preferably from 1 nm to 5 μm and further preferably from 50 nm to 1 μm. When the porous plate-shaped filler 1 having the particle sizes of such a range is included in the heat insulation film 3, the heat insulation effect can improve.

The minimum length of the porous plate-shaped filler 1 is from 0.1 to 50 μm, more preferably from 0.5 to 20 μm, further preferably from 2 to 15 μm, and most preferably from 2 to 10 μm. When the minimum length of the porous plate-shaped filler 1 is shorter than 0.1 μm, it might be difficult to keep the shape of the porous plate-shaped filler 1 in producing steps. When the minimum length of the porous plate-shaped filler 1 is longer than 50 μm, there decreases the number of layers in the porous plate-shaped filler 1 when included in the heat insulation film 3, so that the heat transfer path becomes close to a straight line and accordingly shortens, and the thermal conductivity of the heat insulation film 3 might be high. Furthermore, when the minimum length of the porous plate-shaped filler 1 is short, the heat insulation film 3 can be thinned. That is, even in the thin heat insulation film 3, the heat insulation effect can improve.

The thermal conductivity of the porous plate-shaped filler 1 is preferably 1 W/(m·K) or less. The thermal conductivity is more preferably 0.7 W/(m·K) or less, further preferably 0.5 W/(m·K) or less, and most preferably 0.3 W/(m·K) or less. When the porous plate-shaped filler 1 having such a thermal conductivity is included in the heat insulation film 3, the heat insulation effect can improve.

Furthermore, in the present description, "the thermal conductivity" is obtained by the following equation:

Thermal conductivity (W/(m·K))=thermal diffusivity× specific heat×density

In this equation, "the thermal diffusivity" is measured by a light AC method. Furthermore, "the specific heat" is measured by a DSC method. "The density" is measured by a mercury porosimeter.

It is preferable that a heat capacity of the porous plate-shaped filler 1 is from 10 to 3000 kJ/(m³·K) The heat capacity is more preferably from 10 to 2500 kJ/(m³·K) further preferably from 300 to 2000 kJ/(m³·K) and most preferably from 400 to 1500 kJ/(m³·K) When the porous plate-shaped filler 1 having the heat capacity of such a range is included in the heat insulation film 3, the heat insulation effect can improve. It is to be noted that in the present description, the heat capacity is generally argued per unit volume called volume specific heat, and hence a unit is kJ/(m³·K).

It is to be noted that in the present description, "the heat capacity" is obtained by the following equation:

Heat capacity (kJ/(m³·K))=specific heat×density(apparent particle density)

In this equation, "the specific heat" is measured by the DSC method. Furthermore, "the density (the apparent particle density)" is measured by the liquid immersion method using mercury.

Figure 2B:
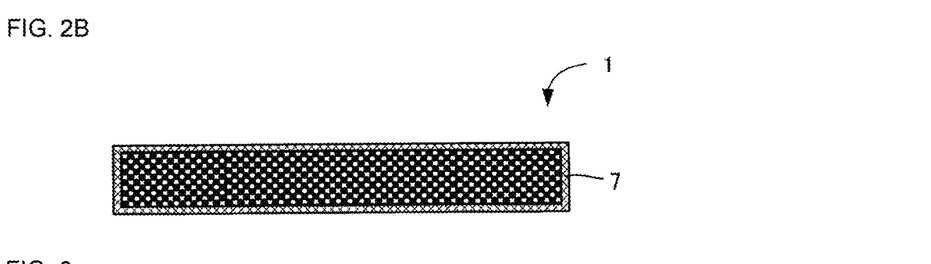
FIG. 2B is a view showing the cross section of the porous plate-shaped filler having a coating layer.

It is preferable that, as shown in FIG. 2B, the porous plate-shaped filler 1 has a coating layer 7 having a thickness of 1 nm to 1 μm in at least a part of its surface. Furthermore, the coating layer 7 is preferably a thermal resistance film to inhibit heat conduction and/or to reflect radiant heat and/or to scatter the lattice vibration (the phonons). When the thermal resistance film having a thickness of several tens nm is formed on the surface of the porous plate-shaped filler 1, it is further preferably possible to decrease the thermal conductivity of the heat insulation film 3. The thermal resistance film may be any film as long as a material thereof is not the same as in the porous plate-shaped filler to be coated, and the porous plate-shaped filler 1 is preferably coated with a different material from the porous plate-shaped filler 1 (e.g., alumina or zinc oxide). Even when the thermal resistance film is dense or porous, there is not any problem, but it is preferable that the film is dense. When the thermal resistance film is formed in a part of the surface of the porous plate-shaped filler 1, an effect of decreasing the thermal conductivity can be obtained, but when the whole surface of the porous plate-shaped filler 1 is coated with the thermal resistance film, the effect of decreasing the thermal conductivity can further be obtained.

2. Method for Producing Porous Plate-Shaped Filler

Next, a method for producing the porous plate-shaped filler 1 will be described. An example of the method for producing the porous plate-shaped filler 1 of the present invention is a method of preparing a slurry including a plate-shaped pore former having an aspect ratio of 1.5 or more and firing the pore former to produce the porous plate-shaped filler 1 including the plate-shaped pores 2 having an aspect ratio of 1.5 or more. Examples of the method for producing the porous plate-shaped filler 1 include press molding, casting, extrusion, injection molding, tape forming, and a doctor blade method. Any method may be used, but hereinafter, the doctor blade method will be described as an example.

First, a pore former, a binder, a plasticizer, a solvent and the like are added to ceramics powder to be mixed by a ball mill or the like, thereby preparing a green sheet forming slurry.

As the ceramics powder, there is usable zirconia powder, partially stabilized zirconia powder (e.g., yttria partially stabilized zirconia powder), completely stabilized zirconia powder (e.g., yttria completely stabilized zirconia powder), alumina powder, silica powder, titania powder, lanthanum oxide powder, yttria powder, rare earth zirconate powder (e.g., lanthanum zirconate powder), rare earth silicate powder (e.g., yttrium silicate powder), niobate powder (e.g., strontium niobate powder), mullite powder, spinel powder, zircon particles, magnesia powder, yttria powder, ceria powder, silicon carbide powder, silicon nitride powder, aluminum nitride powder or the like. One of them may be used, or any combination of two or more of them may be used. Furthermore, the powder is not limited to dried powder, and the powder may be used in a colloidal state (a sol state) in which the powder is dispersed in water or an organic liquid medium.

As the pore former, there is usable graphite, latex, melamine resin, PMMA, polyethylene, polystyrene, carbon black, foamable resin, water absorbable resin or the like. As the binder, there is usable polyvinyl butyral resin (PVB), polyvinyl alcohol resin, polyvinyl acetate resin, polyacrylic resin or the like. As the plasticizer, DBP (dibutyl phthalate), DOP (dioctyl phthalate) or the like is usable. As the solvent, xylene, 1-butanol or the like is usable.

The above green sheet forming slurry is subjected to a vacuum defoaming treatment, thereby adjusting the slurry into 100 to 90000 cps and further preferably 700 to 50000 cps. The angle of the pore 2 is determined by arrangement of the pore former in a formed body (the body formed from a green sheet into a predetermined shape). The lower the viscosity of the green sheet forming slurry is, the more easily the pore former moves during formation, and the more easily the directions are aligned. By adjusting the viscosity into 100 cps or more, it is possible to maintain the shape of the formed body. By adjusting the viscosity into 90000 cps or less, it is possible to form the body into the desirable shape. Therefore, to adjust the angle of the pore 2 into a desirable angle, it is preferable that the viscosity of the green sheet forming slurry is in the above range.

After the adjustment of the viscosity of the green sheet forming slurry, the green sheet is formed from the green sheet forming slurry by a doctor blade device so that a thickness of the fired green sheet is from 0.1 to 100 μm. A thickness of the green sheet is preferably 70 μm or less, more preferably 50 μm or less, and further preferably 30 μm or less. In a case of using the doctor blade device, it is also preferable to decrease the thickness of the green sheet or delay a feeding speed of the green sheet, for the purpose of adjusting the angle of the pore 2 into the desirable angle. Afterward, an outer shape of the green sheet is cut into a dimension of (0.5 to 200) mm×(0.5 to 200) mm. A cut formed body is fired at 800 to 2300° C. for 0.5 to 20 hours and this fired body is suitably ground, thereby making it possible to obtain a porous thin plate-shaped filler (the porous plate-shaped filler 1). It is to be noted that the green sheet before fired may be processed into a predetermined surface shape (a square shape, a quadrangular shape, a hexagonal shape or a round shape) or the like by cutting or punching, and then fired, thereby making it possible to obtain the porous thin plate-shaped filler without performing grinding after the firing.

3. Heat Insulation Film

The heat insulation film 3 will be described with reference to FIG. 3. In the heat insulation film 3 of the present invention, the porous plate-shaped fillers 1 mentioned above are dispersed in a matrix 3m to bond the porous plate-shaped fillers 1. The matrix 3m is a component which is present around the porous plate-shaped fillers 1 and between the particles of the fillers and bonds these particles to each other.

In the heat insulation film 3 of the present invention, it is preferable that the porous plate-shaped fillers 1 are arranged in the form of layers (laminated). The arrangement in the form of the layers mentioned herein indicates that a large number of porous plate-shaped fillers 1 are present in the matrix 3m in a state where the porous plate-shaped fillers 1 are oriented in the direction of the minimum length of the porous plate-shaped filler 1 which is close to a direction parallel to a thickness direction of the heat insulation film 3. It is to be noted that at this time, positions of the porous plate-shaped fillers 1 (a position of the center of gravity) do not have to be orderly periodically arranged in X, Y and Z-directions of the heat insulation film 3 (provided that the Z-direction is defined as the thickness (film thickness) direction), and there is not any problem even when the fillers are present at random. There is not any problem when the number of the layers is 1 or more, but the larger number of the layers is more preferable and the number of the layers is desirably 5 or more. When the porous plate-shaped fillers 1 are laminated in the form of the layers in the heat insulation film 3, the heat transfer path deflects to lengthen, and the heat insulation effect can improve. In particular, for the positions of the porous plate-shaped fillers 1, as shown in FIG. 3, the fillers preferably are not orderly arranged in the Z-direction (the fillers preferably shift alternately), because the heat transfer path more deflects to lengthen.

As shown in FIG. 3, a matrix 3m portion in which the thermal conductivity is high becomes a main heat transfer path, but the heat insulation film 3 of the present invention includes the porous plate-shaped fillers 1, and the heat transfer path makes more detours to a direction in which heat is not to be transferred (the film thickness direction). That is, a length of the heat transfer path increases, and hence it is possible to decrease the thermal conductivity. Additionally, a bonding area between the porous plate-shaped fillers 1 via the matrix 3m is larger than that between spherical fillers, and hence a strength of the whole heat insulation film heightens, and erosion, peeling or the like is hard to occur.

In the heat insulation film 3, the porous plate-shaped fillers 1 are the plates, and hence concavity and convexity are hard to be formed on the outermost surface of the heat insulation film 3 as compared with the case of the spherical fillers. Therefore, even in a case of giving shock to a heat insulation film portion, it is possible to prevent particle drop of the porous plate-shaped fillers 1, i.e., deficiency of the heat insulation film 3.

It is preferable that the heat insulation film 3 of the present invention includes at least one of ceramics, glass and resin as the matrix 3m. From the viewpoint of the heat resistance, ceramics or glass is more preferable. More specifically, examples of a material forming the matrix 3m include silica, alumina, mullite, zirconia, titania, silicon nitride, acid silicon nitride, silicon carbide, acid silicon carbide, calcium silicate, calcium aluminate, calcium aluminosilicate, aluminum phosphate, aluminosilicate, potassium aluminosilicate, and glass. These materials are preferably amorphous from the viewpoint of the thermal conductivity. Alternatively, in a case where the material of the matrix 3m is ceramics, the matrix is preferably an aggregate of particulates having particle diameters of 500 nm or less. When the aggregate of the particulates having the particle diameters of 500 nm or less is used as the matrix 3m, it is possible to further decrease the thermal conductivity. Furthermore, in a case where the material forming the matrix 3m is a resin, examples of the material include a silicone resin, a polyimide resin, a polyamide resin, an acrylic resin, and an epoxy resin.

In the heat insulation film 3, it is preferable that a porosity of the whole heat insulation film 3 is from 10 to 90%, a porosity of the porous plate-shaped filler 1 is from 20 to 90%, and a porosity of the matrix 3m is from 0 to 70%.

In the heat insulation film 3 of the present invention, it is preferable that a thickness is from 1 μm to 5 mm. According to such a thickness, it is possible to obtain the heat insulation effect without adversely affecting characteristics of a substrate 8 coated with the heat insulation film 3. It is to be noted that the thickness of the heat insulation film 3 can suitably be selected in the above range in accordance with its use application.

In the heat insulation film 3 of the present invention, a heat capacity is preferably 1500 kJ/(m$^3$·K) or less, more preferably 1300 kJ/(m$^3$·K) or less, further preferably 1000 kJ/(m$^3$·K) or less, and most preferably 500 kJ/(m$^3$·K) or less. When the film has a low heat capacity, for example, a temperature of the heat insulation film 3 is easy to drop after exhaust of fuel in a case of forming the heat insulation film 3 in an engine combustion chamber. Consequently, it is possible to inhibit a problem such as abnormal combustion of an engine.

In the heat insulation film 3 of the present invention, it is preferable that the thermal conductivity in the thickness direction is 1.5 W/(m·K) or less. The thermal conductivity of the heat insulation film 3 is further preferably 1 W/(m·K) or less and most preferably 0.5 W/(m·K) or less. The heat insulation film has a low thermal conductivity, thereby making it possible to inhibit the heat transfer.

Next, a method for producing the heat insulation film 3 will be described. First, there is prepared a coating composition including the porous plate-shaped filler 1 mentioned above, and one or more selected from the group consisting of an inorganic binder, an inorganic polymer, an organic/inorganic hybrid material, oxide sol, and water glass. The coating composition may further include dense fillers, a viscosity modifier, a liquid medium, a dispersing agent and the like. By performing coating, drying and/or a heat treatment of the coating composition, the heat insulation film 3 can be formed.

Specific substances to be included in the coating composition are cement, bentonite, aluminum phosphate, silica sol, alumina sol, boehmite sol, zirconia sol, titania sol, tetramethyl orthosilicate, tetraethyl orthosilicate, polysilazane, polycarbosilane, polyvinyl silane, polymethyl silane, polysiloxane, polysilsesquioxane, silicone, geopolymer, sodium silicate and the like. Furthermore, in the case of the organic/inorganic hybrid material, there are desirable an acryl-silica based hybrid material, an epoxy-silica based hybrid material, a phenol-silica based hybrid material, a polycarbonate-silica based hybrid material, a nylon-silica based hybrid material, a nylon-clay based hybrid material, an acryl-alumina based hybrid material, an acryl-calcium silicate hydrate based hybrid material and the like.

Examples of the liquid medium include ethanol and 2-propanol, but there is not any special restriction on the liquid medium. There is also not any special restriction on the dispersing agent, but examples of the dispersing agent include anionic substances such as alkylol ammonium salt, soap (fatty acid sodium salt), monoalkyl sulfate, alkyl polyoxyethylene sulfate, alkylbenzenesulfonate, and monoalkyl phosphate; cationic substances such as alkyltrimethylammonium salt, dialkyldimethylammonium salt, and alkyl benzyl dimethyl ammonium salt; geminate substances such as alkyl dimethylamine oxide, and alkyl carboxybetaine; and non-ionic substances such as polyoxyethylene alkyl ether, fatty acid sorbitan ester, alkyl polyglucoside, fatty acid diethanolamide, and alkyl monoglyceryl ether. By adding the dispersing agent as much as 0.04 to 3 parts by mass to 100 parts by mass of porous plate-shaped fillers 1, the porous plate-shaped fillers 1 are easily uniformly dispersed in the coating composition.

A viscosity of the coating composition is preferably from 0.1 to 5000 cps, and further preferably from 0.5 to 1000 cps. In a case where the viscosity is smaller than 0.1 cps, the coating composition flows after coating, and a thickness of a coating film might be non-uniform. In a case where the viscosity is larger than 5000 cps, the coating composition does not have any fluidity and might not easily uniformly coat the substrate.

The heat insulation film 3 in which the porous plate-shaped fillers 1 are uniformly dispersed in the matrix 3m can be obtained by adjusting the viscosity. For example, when the viscosity is excessively high, the porous plate-shaped fillers 1 are hard to be uniformly dispersed, and a portion where there are less porous plate-shaped fillers 1 is easily generated in the heat insulation film 3. The adding of the dispersing agent improves dispersing properties of the porous plate-shaped fillers 1 in the coating composition (the slurry), thereby making it possible to form the heat insulation film 3 which is homogeneous. That is, by improving the dispersing properties of the porous plate-shaped fillers 1, the homogeneous heat insulation film 3 can be formed, and it is possible to decrease the thermal conductivity.

The heat insulation film 3 can be formed by coating the substrate 8 with the above-mentioned coating composition and drying the coating composition. Furthermore, the film may be formed by performing a heat treatment after the drying. At this time, the thick heat insulation film 3 can be formed by repeatedly performing the coating and the drying or the heat treatment. Alternatively, the heat insulation film 3 is formed on a virtual substrate, and then the virtual substrate is removed, thereby separately preparing the heat insulation film 3 singly formed into a thin plate, and the heat insulation film 3 may be adhesively bonded to or bonded to the substrate 8. As the substrate 8, a metal, ceramics, glass, plastic, wood, cloth, paper or the like is usable. In particular, examples of the substrate 8 made of the metal include iron, an iron alloy, stainless steel, aluminum, an aluminum alloy, a nickel alloy, a cobalt alloy, a tungsten alloy, and a copper alloy.

The heat insulation film 3 of the present invention can be utilized in an engine combustion chamber, a pipe, cookware, a building material or the like.

EXAMPLES

Hereinafter, the present invention will be described in more detail on the basis of examples, but the present invention is not limited to these examples.

(Porous Plate-Shaped Filler Preparing Method)

Example 1

First, to yttria partially stabilized zirconia powder, there were added a pore former (plate-shaped graphite: SEC carbon SGP-3), polyvinyl butyral resin (PVB) as a binder, DOP as a plasticizer, and xylene and 1-butanol as solvents, followed by mixing in a ball mill for 30 hours, to prepare a green sheet forming slurry. This slurry was subjected to a vacuum defoaming treatment to adjust a viscosity into 20000 cps, and then a green sheet was formed and ground to obtain a thickness of 10 μm after firing by a doctor blade device, thereby obtaining a formed body of a thin plate. This formed body was fired at 1100° C. for one hour, thereby obtaining porous thin plate-shaped fillers (porous plate-shaped fillers 1).

Examples 2 to 8

The procedure of Example 1 was repeated to obtain porous plate-shaped fillers 1. Table 1 shows types of used pore formers, aspect ratios and viscosities of green sheet forming slurries. Additionally, in Example 8, 50 vol % of an amount of the pore former to be added was graphite, and 50 vol % thereof was carbon black.

Examples 9 to 16

The procedure of Example 1 was repeated to obtain porous plate-shaped fillers 1. Table 1 shows types of used pore formers, aspect ratios and viscosities of green sheet forming slurries. Additionally, each green sheet was formed and ground so that a thickness and an aspect ratio of the fired porous plate-shaped filler 1 were values shown in Table 2.

Examples 17 to 25

Porous plate-shaped fillers 1 of materials different from that of Example 1 were prepared. Table 1 shows the materials of the porous plate-shaped fillers 1.

Comparative Example 1

A porous plate-shaped filler 1 was obtained in the same manner as in the examples. As a pore former, spherical carbon black was used.

TABLE 1

| | Type of pore former | Aspect ratio of pore former | Material type of filler | Green sheet forming slurry viscosity [cps] |
|---|---|---|---|---|
| Comparative Example 1 | Spherical carbon black | 1 | Yttria partially stabilized zirconia | 4000 |
| Example 1 | Plate-shaped graphite | 1.5 | Yttria partially stabilized zirconia | 20000 |
| Example 2 | Plate-shaped graphite | 3 | Yttria partially stabilized zirconia | 20000 |
| Example 3 | Plate-shaped graphite | 3 | Yttria partially stabilized zirconia | 4000 |
| Example 4 | Plate-shaped graphite | 3 | Yttria partially stabilized zirconia | 1000 |
| Example 5 | Plate-shaped graphite | 5 | Yttria partially stabilized zirconia | 4000 |
| Example 6 | Plate-shaped latex | 3 | Yttria partially stabilized zirconia | 4000 |
| Example 7 | Plate-shaped water absorbable resin | 3 | Yttria partially stabilized zirconia | 4000 |
| Example 8 | Plate-shaped graphite 50% | 1 | Yttria partially stabilized zirconia | 4000 |
| | Spherical carbon black 50% | 5 | Yttria partially stabilized zirconia | |
| Example 9 | Plate-shaped graphite | 3 | Yttria partially stabilized zirconia | 1000 |
| Example 10 | Plate-shaped graphite | 3 | Yttria partially stabilized zirconia | 1000 |
| Example 11 | Plate-shaped graphite | 3 | Yttria partially stabilized zirconia | 1000 |
| Example 12 | Plate-shaped graphite | 3 | Yttria partially stabilized zirconia | 1000 |
| Example 13 | Plate-shaped graphite | 3 | Yttria partially stabilized zirconia | 1000 |
| Example 14 | Plate-shaped graphite | 3 | Yttria partially stabilized zirconia | 1000 |
| Example 15 | Plate-shaped graphite | 3 | Yttria partially stabilized zirconia | 1000 |

TABLE 1-continued

| | Type of pore former | Aspect ratio of pore former | Material type of filler | Green sheet forming slurry viscosity [cps] |
|---|---|---|---|---|
| Example 16 | Plate-shaped graphite | 3 | Yttria partially stabilized zirconia | 1000 |
| Example 17 | Plate-shaped graphite | 3 | Yttria partially stabilized zirconia | 1000 |
| Example 18 | Plate-shaped graphite | 3 | Zirconia | 1000 |
| Example 19 | Plate-shaped graphite | 3 | Alumina | 1000 |
| Example 20 | Plate-shaped graphite | 3 | Silica | 1000 |
| Example 21 | Plate-shaped graphite | 3 | Titania | 1000 |
| Example 22 | Plate-shaped graphite | 3 | Lanthanum oxide | 1000 |
| Example 23 | Plate-shaped graphite | 3 | Yttria | 1000 |
| Example 24 | Plate-shaped graphite | 3 | Lanthanum zirconate | 1000 |
| Example 25 | Plate-shaped graphite | 3 | Yttrium silicate | 1000 |

In the porous plate-shaped fillers 1 of Examples 1 to 8 and Comparative Example 1, an average aspect ratio of optional 20 fillers was 4, the fillers included pores 2 having a pore size of 150 nm, and a thickness (a minimum length) was 10 μm. Furthermore, a porosity was 60%. The porosity was obtained by the following equation:

Porosity (%)=(1−(apparent particle density/true density))×100

In the above equation, the apparent particle density was measured by a liquid immersion method using mercury. Furthermore, the true density was measured by pycnometry after sufficiently grinding the porous plate-shaped filler 1. Each of the porous plate-shaped fillers 1 of Examples 9 to 25 had an aspect ratio, pore sizes, a minimum length and a porosity shown in Table 2.

(Pore Shape of Porous Plate-Shaped Filler)

Figure 4A:
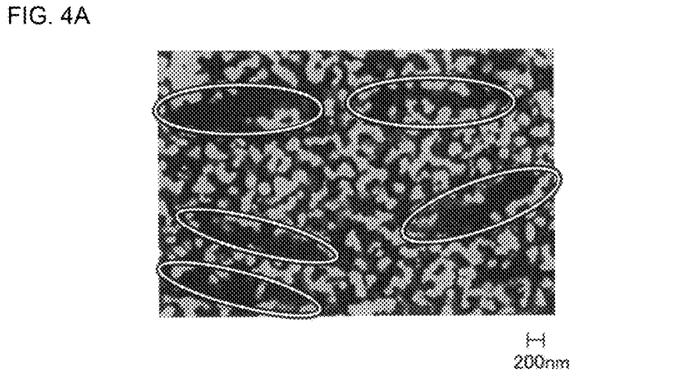
FIG. 4A is an FE-SEM photograph in a minimum length direction of porous plate-shaped fillers of Example 1.
Figure 4B:
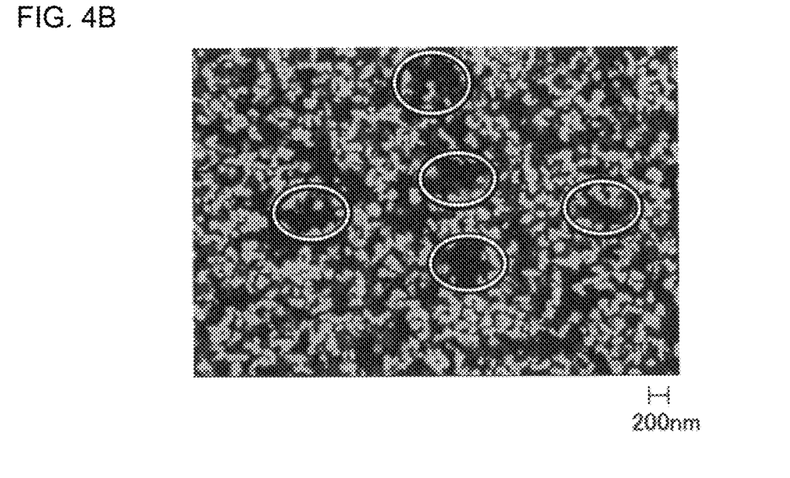
FIG. 4B is an FE-SEM photograph in a minimum length direction of porous plate-shaped fillers of Comparative Example 1.

One filler was selected at random, and fine structure observation was performed with FE-SEM. FIG. 4A shows Example 1 of an FE-SEM photograph of minimum length directions of the porous plate-shaped fillers 1 and FIG. 4B shows Comparative Example 1 thereof. Circles are the pores 2 formed by a pore former. Shapes of 50 pores 2 present in the filler were observed, and a minimum length and a maximum length were measured. The maximum length/the minimum length was defined as the aspect ratio, to obtain an average of the aspect ratios. Table 2 shows a case where the average aspect ratio of the pores 2 is 1.5 or more as A, and shows another case as B. Furthermore, Table 2 shows a case where an average aspect ratio of the pores 2 is 3 or more as A, and shows another case as B. Furthermore, it was confirmed whether the minimum length of the pore 2 was the same direction as in the minimum length of the porous plate-shaped filler 1. 50 pores 2 were selected at random, and angles k (see FIG. 2A) between the directions of the minimum lengths of the pores 2 and the direction of the minimum length of the porous plate-shaped filler 1 were measured, to obtain an average of the angles.

(Thermal Conductivity Measuring Method of Porous Plate-Shaped Filler)

The porous plate-shaped filler 1 which was 0.5 mm in the minimum length direction and had a size of 10 mm was separately prepared, and a thermal conductivity of the porous plate-shaped filler 1 in the minimum length direction was measured by laser flash.

(Heat Capacity Measuring Method of Porous Plate-Shaped Filler)

A heat capacity of the porous plate-shaped filler 1 was calculated as follows. Specific heat was measured by a DSC method, and a product of specific heat and a density (an apparent particle density) was obtained as the heat capacity of the porous plate-shaped filler 1. The apparent particle density was measured by the liquid immersion method using mercury.

(Preparing Method of Heat Insulation Film)

Examples 1 to 25 and Comparative Example 1

Next, there was prepared a coating composition including polysiloxane forming a matrix 3m, a porous plate-shaped filler 1, and water. Additionally, a dispersing agent was added to the coating composition. A stainless steel substrate (a diameter of 10 mm and a thickness of 1 mm) which was a substrate material was coated and dried, and then a heat insulation film 3 was formed by a heat treatment at 200° C. In the heat insulation film 3, 5 or more porous plate-shaped fillers 1 were laminated in a thickness direction, and a thickness of the film was about 100 μm.

(Thermal Conductivity Measuring Method of Heat Insulation Film)

There was measured a thermal conductivity in a cross section of the heat insulation film 3 which was parallel to its thickness direction by a laser flash 2-layer model.

TABLE 2

| | Filler | | | | | | | | Heat insulation film |
|---|---|---|---|---|---|---|---|---|---|
| | | | Pores of filler | | | | | | |
| | Minimum length [μm] | Aspect ratio | Pore size of plate-shaped pore [nm] | Porosity [%] | Aspect ratio 1.5 or more | Aspect ratio 3 or more | Angle [°] | Thermal conductivity [W/(m·K)] | Heat capacity [kJ/(m³·K)] | Thermal conductivity [W/(m·K)] |
| Comparative Example 1 | 10 | 4 | 150 | 60 | B | B | — | 1.10 | 1000 | 2.00 |

TABLE 2-continued

| | Filler | | | | | | | | Heat insulation film |
| --- | --- | --- | --- | --- | --- | --- | --- | --- | --- |
| | Pores of filler | | | | | | Thermal | Heat | Thermal |
| | Minimum | | Pore size of plate- | | Aspect ratio | | | | |
| | length [μm] | Aspect ratio | shaped pore [nm] | Porosity [%] | 1.5 or more | 3 or more | Angle [°] | conductivity [W/(m · K)] | capacity [kJ/(m³ · K)] | conductivity [W/(m · K)] |
| Example 1 | 10 | 4 | 150 | 60 | A | B | 40 | 0.90 | 1000 | 1.40 |
| Example 2 | 10 | 4 | 150 | 60 | A | A | 40 | 0.80 | 1000 | 1.30 |
| Example 3 | 10 | 4 | 150 | 60 | A | A | 10 | 0.40 | 1000 | 0.60 |
| Example 4 | 10 | 4 | 150 | 60 | A | A | 10 | 0.30 | 1000 | 0.50 |
| Example 5 | 10 | 4 | 150 | 60 | A | A | 10 | 0.20 | 1000 | 0.45 |
| Example 6 | 10 | 4 | 150 | 60 | A | A | 10 | 0.30 | 1000 | 0.50 |
| Example 7 | 10 | 4 | 150 | 60 | A | A | 10 | 0.30 | 1000 | 0.50 |
| Example 8 | 10 | 4 | 150 | 60 | A | A | 10 | 0.40 | 1000 | 0.60 |
| Example 9 | 10 | 8 | 150 | 60 | A | A | 10 | 0.30 | 1000 | 0.45 |
| Example 10 | 2 | 20 | 150 | 60 | A | A | 10 | 0.30 | 1000 | 0.38 |
| Example 11 | 3 | 4 | 150 | 60 | A | A | 10 | 0.30 | 1000 | 0.45 |
| Example 12 | 7 | 4 | 150 | 60 | A | A | 10 | 0.30 | 1000 | 0.47 |
| Example 13 | 15 | 4 | 150 | 60 | A | A | 10 | 0.30 | 1000 | 0.60 |
| Example 14 | 10 | 4 | 150 | 52 | A | A | 10 | 0.50 | 1250 | 0.68 |
| Example 15 | 10 | 4 | 150 | 70 | A | A | 10 | 0.15 | 750 | 0.27 |
| Example 16 | 10 | 4 | 150 | 78 | A | A | 10 | 0.10 | 560 | 0.24 |
| Example 17 | 10 | 4 | 150 | 60 | A | A | 10 | 0.30 | 1000 | 0.50 |
| Example 18 | 10 | 4 | 150 | 60 | A | A | 10 | 0.30 | 1000 | 0.50 |
| Example 19 | 10 | 4 | 150 | 60 | A | A | 10 | 0.50 | 1000 | 0.68 |
| Example 20 | 10 | 4 | 150 | 60 | A | A | 10 | 0.30 | 1000 | 0.50 |
| Example 21 | 10 | 4 | 150 | 60 | A | A | 10 | 0.30 | 1000 | 0.50 |
| Example 22 | 10 | 4 | 150 | 60 | A | A | 10 | 0.50 | 1000 | 0.68 |
| Example 23 | 10 | 4 | 150 | 60 | A | A | 10 | 0.50 | 1000 | 0.68 |
| Example 24 | 10 | 4 | 150 | 60 | A | A | 10 | 0.30 | 1000 | 0.50 |
| Example 25 | 10 | 4 | 150 | 60 | A | A | 10 | 0.30 | 1000 | 0.50 |

In the porous plate-shaped filler 1 including the plate-shaped pores 2 having an aspect ratio of 1.5 or more, the thermal conductivity was low, and in the heat insulation film 3 including the fillers, the thermal conductivity decreased. Furthermore, when comparing Examples 9 to 16 and Example 4, as the minimum length of the porous plate-shaped filler 1 was shorter, the aspect ratio was larger and the porosity was higher, the thermal conductivity of the heat insulation film 3 including the fillers decreased. Furthermore, in Examples 17 to 25 of the porous plate-shaped fillers 1 in which the materials were changed, it was possible to obtain the heat insulation films 3 having a low thermal conductivity. For yttria partially stabilized zirconia (Examples 1 to 16), yttria completely stabilized zirconia (Example 17) and zirconia (Example 18) which were zirconia based materials, it was possible to especially decrease the thermal conductivity. Furthermore, in a metal oxide, ion bonding properties between a metal and oxygen were strong, and hence for alumina (Example 19), silica (Example 20), titania (Example 21), lanthanum oxide (Example 22) and yttria (Example 23) which were metal oxides, it was possible to decrease the thermal conductivity. For lanthanum zirconate (Example 24) and yttrium silicate (Example 25), it was also possible to obtain suitable results.

INDUSTRIAL APPLICABILITY

It was possible to apply a porous plate-shaped filler, a heat insulation film, and a method for producing the porous plate-shaped filler of the present invention to an engine for a car or the like, a pipe, a building material, cookware or the like.

DESCRIPTION OF REFERENCE NUMERALS

1: porous plate-shaped filler, 2: pore, 3: heat insulation film, 3m: matrix, 7: coating layer, and 8: substrate.

The invention claimed is:

1. A porous plate-shaped filler which is a plate shape having a length to thickness aspect ratio of 3 or more, has a thickness of 0.1 to 50 μm and a porosity of 20 to 90%, and includes plate-shaped pores having an aspect ratio of 1.5 or more.

2. The porous plate-shaped filler according to claim 1, wherein in a cross section in the thickness direction of the porous plate-shaped filler, an average of angles between directions of thicknesses of the pores and the thickness direction of the porous plate-shaped filler is 45° or less.

3. The porous plate-shaped filler according to claim 1, wherein a thermal conductivity in the thickness direction of the porous plate-shaped filler is 1 W/(m·K) or less.

4. A heat insulation film which includes the porous plate-shaped filler according to claim 1.

5. The heat insulation film according to claim 4, wherein the thermal conductivity in a thickness direction is 1.5 W/(m·K) or less.

6. A method for producing the porous plate-shaped filler according to claim 1, which comprises: preparing a slurry including a plate-shaped pore former having an aspect ratio of 1.5 or more; and firing the pore former to produce the porous plate-shaped filler including the plate-shaped pores having an aspect ratio of 1.5 or more.

7. The method for producing the porous plate-shaped filler according to claim 6, wherein a viscosity of the slurry is from 100 to 90000 cps.

* * * * *